United States Patent
Patey et al.

(10) Patent No.: US 9,009,718 B2
(45) Date of Patent: Apr. 14, 2015

(54) PROCESSING SINGLETON TASK(S) ACROSS ARBITRARY AUTONOMOUS SERVER INSTANCES

(75) Inventors: Eric M. Patey, Rockport, MA (US); Jason Schleifer, Cambridge, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 801 days.

(21) Appl. No.: 12/533,379

(22) Filed: Jul. 31, 2009

(65) Prior Publication Data

US 2011/0029976 A1 Feb. 3, 2011

(51) Int. Cl.
*G06F 9/46* (2006.01)
*G06F 9/50* (2006.01)

(52) U.S. Cl.
CPC ................................ *G06F 9/5072* (2013.01)

(58) Field of Classification Search
None
See application file for complete search history.

(56) References Cited

U.S. PATENT DOCUMENTS

| 6,016,500 | A  | * | 1/2000  | Waldo et al. ........................ 1/1 |
| 6,760,736 | B2 |   | 7/2004  | Waldo et al. |
| 7,536,581 | B2 |   | 5/2009  | Fiske |
| 8,122,108 | B2 | * | 2/2012  | Revanuru et al. ............ 709/220 |
| 2002/0138561 | A1 | * | 9/2002 | Chatfield et al. ............... 709/203 |
| 2002/0152214 | A1 |   | 10/2002 | Muntz |
| 2003/0126164 | A1 | * | 7/2003 | O'Connor et al. ............ 707/206 |
| 2003/0217062 | A1 | * | 11/2003 | Thomas et al. .................. 707/10 |
| 2006/0168167 | A1 |   | 7/2006 | Kushalnagar et al. |
| 2008/0270487 | A1 |   | 10/2008 | Weijun et al. |

OTHER PUBLICATIONS

"Interface Leasing", Leasing (BEA WebLogic Server 9.2 API Reference), pp. 1-4.
"Service-Level Migration", 2008, pp. 1-14.
"Optimistic Concurrency", 2009 Microsoft Corporation, pp. 1-5, http://msdn.microsoft.com/en-us/library/aa0416cz(VS.71).aspx.
"Migration", 2008, pp. 1-16.
Rose, et al., "Improving Failure Responsiveness in Jini Leasing".

* cited by examiner

*Primary Examiner* — Meng An
*Assistant Examiner* — Wissam Rashid
(74) *Attorney, Agent, or Firm* — Dan Choi; Judy Yee; Micky Minhas

(57) ABSTRACT

Large scale internet services may be implemented using multiple discrete server instances. Some tasks of the large scale internet services may be singleton tasks, which may be advantageously processed by a sub-set of the server instances (e.g., merely one instance). Accordingly, as provided herein, a singleton task may be processed in a reliable manner based upon one or more instances of a protocol executed across a set of arbitrary autonomous server instances. In one example, the protocol may determine whether a lease for a singleton task is valid or expired. If the lease is expired, then an attempt to claim the lease may be performed by updating a current lease expiration with a new lease expiration. If the attempt is successful, then the singleton task may be processed until the new lease expiration expires.

20 Claims, 9 Drawing Sheets

PROCESSING SINGLETON TASK(S) ACROSS ARBITRARY AUTONOMOUS SERVER INSTANCES

BACKGROUND

Large scale network services may be implemented using multiple discrete server instances in an effort to increase robustness, capacity, and performance. These network services may be enhanced by scaling out the number of discrete server instances as opposed to scaling up. That is, it may be advantageous to have a large number of commodity server machines with minimal interaction between one another in comparison to a smaller number of powerful server machines. Scaling out along with reducing accumulated state information (e.g., an affinity between a task and a particular server instance because of cached data) may mitigate the overhead in adding new server instances or replacing failed server instances. Efficiency and proper task performance (e.g., a singleton task performed by a particular number of server instances) may be become an issue when introducing new server instances into an always on network service environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for processing a singleton task is disclosed herein. A singleton task, for example, may be a task (e.g., retrieve email, retrieve SMS messages, a task performed by one or more server instances within a computing environment, etc.) in which it may be beneficial that a particular number of server instances perform the task. For example, it may be advantageous for merely a single server instance to perform an email retrieval singleton task, while other processing tasks related to the retrieved email may be performed by multiple server instances. A lease may be associated with a singleton task (e.g., a row within a database comprising a lease expiration associated with a lease of the singleton task) to facilitate the processing of the singleton task in accordance with a contract (e.g., a designation of a particular number of server instances that may process a singleton task).

A lease for a singleton task may be determined, for example, by a server instance executing a protocol, as valid or expired. For example, a current lease expiration of the lease may be compared with a current time to determine whether the lease is expired (e.g., the lease is expired if the current time exceeds the current lease expiration, the lease is valid if the current time does not exceed the current lease expiration or rather the current lease expiration exceeds the current time). If the lease is valid, then the server instance may wait until the current time exceeds the current lease expiration (e.g., an anticipated expiration of the current lease) and then again determine whether the lease for the singleton task is valid or expired. Otherwise, if the lease is expired, then an attempt may be made to claim the lease with a new lease expiration. For example, an attempt may be made to update a database row comprising the current lease expiration of the lease with the new lease expiration.

If the attempt to claim the lease is unsuccessful (e.g., another server instance successfully updated the database row with a claim to the lease), then the server instance may again determine whether the lease for the singleton task is valid or expired. Otherwise, if the attempt to claim the lease is successful, then the singleton task may be processed until the new lease expiration expires. Attempts by other server instances may be unsuccessful, which provides that the singleton task is performed according to a contract specifying, for example, that one server instance may perform the singleton task (e.g., the one server instances successfully claiming the lease), while the unsuccessful server instances may try again later (e.g., when the new lease expiration expires). It may be appreciated that the technique for processing a singleton task described herein may be, for example, incorporated into a protocol executed by a large number of server instances (e.g., hundreds of server instances participating in a network service environment) to facilitate the processing of one or more singleton tasks based upon respective contracts of the one or more singleton tasks.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
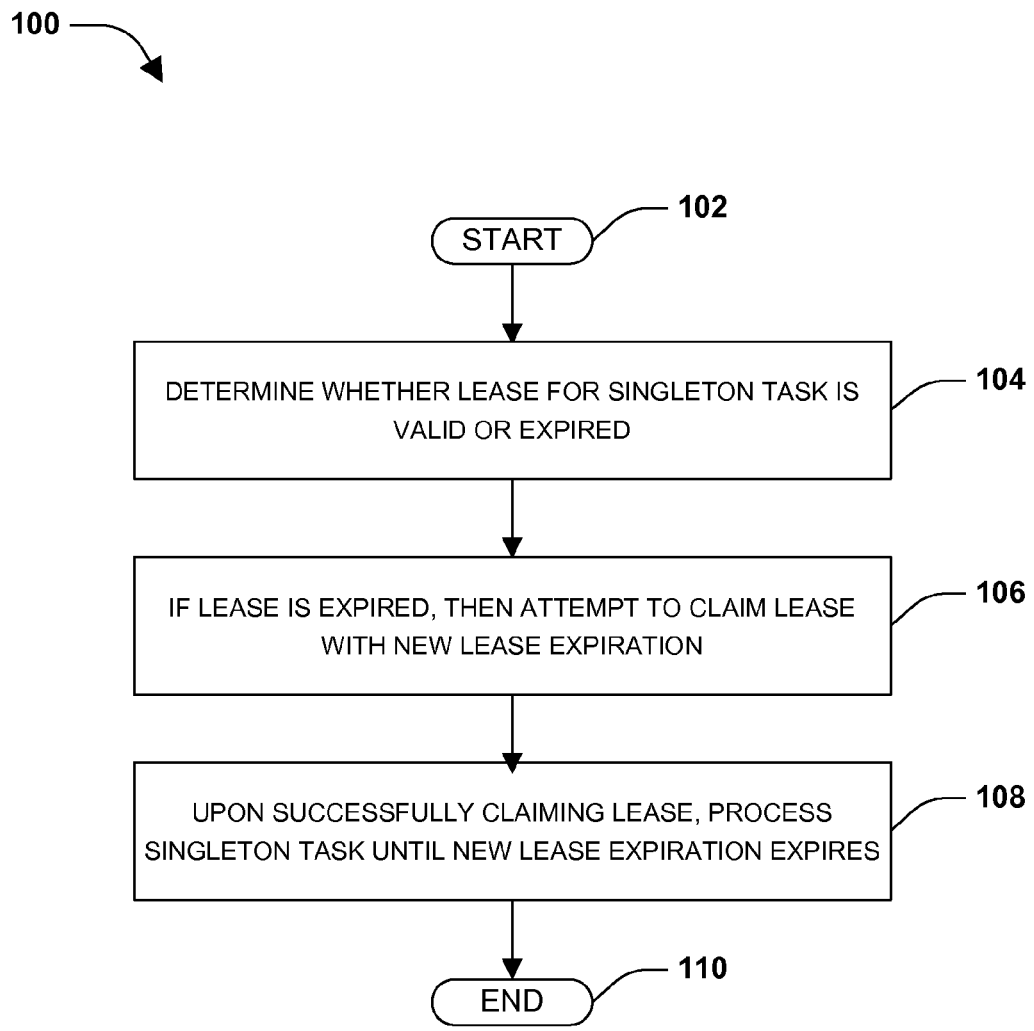
FIG. 1 is a flow chart illustrating an exemplary method of processing a singleton task.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Within a computer environment, the processing of tasks may be distributed among multiple server instances to increase robustness, capacity, and performance. Nevertheless, it is common for some tasks to be singleton tasks. That is, it may be advantageous to have a subset of server instances (e.g., a single server instance) perform the singleton task instead of many server instances. In one example, a contract may specify a particular number of server instances that may process a singleton task. Providing that singleton tasks are performed correctly becomes complicated when new server instances are introduced into the computer environment (e.g., when a failed server instance is replaced) and/or when server instances are removed from the computer environment (e.g., server failure, lower capacity requirements, etc.). Because the computer environment may be in an always on state, there is no global bootstrap concept that may be used to provide compliance with contracts regarding singleton tasks. Moreover, server instances may have minimal knowledge of other server instances in an effort to minimize state management. Because of the lack of bootstrap and the minimal awareness between server instances, human intervention may be currently needed to assign singleton tasks when new servers are introduced into a computing environment. Requiring human intervention can introduce large time delays (e.g., if a failure occurs in the middle of the night and is not discovered until the morning) and introduce an opportunity for human error.

Among other things, a technique for processing a singleton task is provided herein. In one example, the technique may be implemented as a protocol used by multiple server instances to process a singleton task according to a contract specifying a desired number of server instances that may perform the singleton task. The protocol may be implemented across multiple server instances coordinated through a database comprising rows having lease information (e.g., a current lease expiration) corresponding to singleton tasks. The protocol may be based upon an optimistic concurrency implemented though a leasing model facilitated through the database. In this way, leases may be awarded and lease duration and fault recovery durations may be specified.

One embodiment of processing a singleton task is illustrated by an exemplary method 100 in FIG. 1. At 102, the method begins. At 104, a lease for a singleton task may be determined as valid or expired. For example, a lease may be determined as valid if a current lease expiration of the lease exceeds the current time (e.g., the current time has not yet reached the expiration time of the lease). Otherwise, the lease may be determined as expired if the current time exceeds the current lease expiration (e.g., the current time has reached the expiration time of the lease). At 106, if the lease is expired, then an attempt may be made to claim the lease with a new lease expiration. For example, a database operation to update the current lease expiration of the lease with the new lease expiration may be performed. If successful, the lease will be claimed by the server instance performing the update. It may be appreciated that a singleton task may be performed by a subset of server instances that claim a lease for a singleton task. That is, even though the examples described herein refer to a single server instance claiming a lease of a singleton task, it may be appreciated that multiple server instances may claim a lease of a singleton task (e.g., a small subset of server instances). It may be appreciated that multiple server instances may attempt to claim the lease of the singleton task, but because the singleton task may be designated by a contract to be performed by merely one server instance, that all but one server instance may fail at claiming the lease, for example.

At 108, upon successfully claiming the lease, the singleton task may be processed until the new lease expiration expires. At this point, the server instance has claimed the lease for the singleton task and can take action based upon that claim until the new lease expiration expires. Other server instances may be barred from processing the singleton task based upon the claim to the lease. This provides that the singleton task is processed by the designated number of server instances, for example, as specified by a contract. At 110, the method ends.

Figure 2:
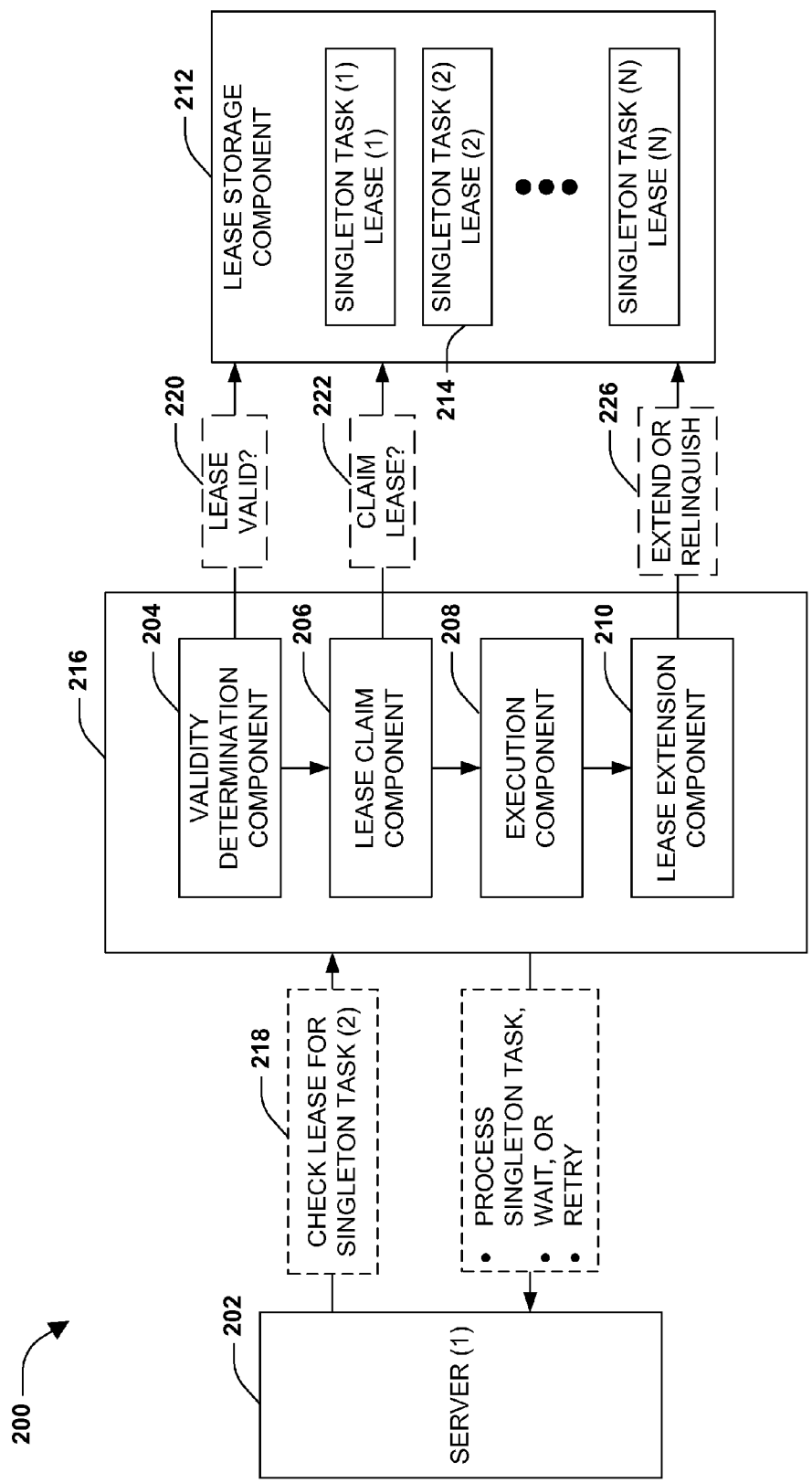
FIG. 2 is a component block diagram illustrating an exemplary system for processing a singleton task.

FIG. 2 illustrates an example 200 of a system 216 configured for processing a singleton task. The system 216 may comprise a validity determination component 204, a lease claim component 206, an execution component 208, and/or a lease extension component 210. In one example, the system 216 may be associated with a lease storage component 212. In another example, the system 216 may comprise the lease storage component 212. The lease storage component 212 (e.g., a lease storage component 402 of FIG. 4) may be, for example, a database table configured to store one or more rows, respective rows comprising information of a singleton task and a lease for the singleton task (e.g., a singleton task (2) & lease (2) 214).

The system 216 may be associated with a server (1) 202 within a computer environment. For example, the system 216 may be configured to perform functionality of a steady state protocol that server (1) 202 may execute in regard to performing singleton tasks as defined by a contract. It may be appreciated that the computer environment may comprise multiple servers, respective servers configured to process singleton tasks through instances of the system 216.

The validity determination component 204 may be configured to determine whether a lease for a singleton task is valid or expired. For example, the lease may be valid if a current lease expiration exceeds a current time, otherwise the lease may be expired if the current time exceeds the current lease expiration. Upon determining the lease is valid, the validity determination component 204 may be configured to wait until a current time exceeds the current lease expiration, and once the current lease expiration is exceeded, then again determine whether the lease for the singleton task is valid or expired. The validity determination component 204 may be configured to wait for a valid lease to expire because another server may be processing the singleton task, whereas if yet another server begins processing the singleton task, then a contract may be violated because too many servers are processing the singleton task.

In one example, the server (1) 202 may request 218 the validity determination component 204 to check a lease for the singleton task (2). The validity determination component 204 may make a determination 220 as to whether the singleton task (2) & lease (2) 214 within the lease storage component 212 is valid. If the singleton task (2) & lease (2) 214 is valid, then the validity determination component 204 may wait until the current time exceeds the current lease expiration, and once the current lease expiration is exceeded, then again determine whether the lease for the singleton task is valid or expired. Otherwise, if the lease singleton task (2) & lease (2) 214 is expired, the lease claim component 206 may attempt to claim the singleton task (2) & lease (2) 214.

The lease claim component 206 may be configured to attempt to claim the lease with a new lease expiration based upon the lease being expired. That is, the lease claim component 206 may attempt to update a current lease expiration within a database row corresponding to a singleton task with the new lease expiration. The update may be successful or fail due to other servers attempting to claim the lease of the singleton task. In one example, the lease claim component 206, upon a determination that the singleton task (2) & lease (2) 214 is expired, may attempt to claim 222 the singleton task (2) & lease (2) 214 within the lease storage component 212. For example, a new lease expiration based upon a current time and a pre-defined lease duration may be used to update a current lease expiration of the singleton task (2) & lease (2)

214. The pre-defined lease duration may be defined based upon efficiency and/or time to detect a failure. For example, a longer pre-defined lease duration allows a server to process a singleton task longer to increase processing efficiency. That is, strain/load on the validity determination component 204 may be reduced by extending a pre-defined lease duration, for example, for long running operations. A shorter pre-defined lease duration may reduce the time to detect that a server has failed.

It may be appreciated that the lease claim component 206 may be configured to attempt to claim the lease based upon an optimistic concurrent database design. That is, the lease claim component 206 may assume the claim (e.g., an update to a database row) will succeed without conflict, and may be configured to properly handle situations in which a conflict results. In one example, an initial database read may be performed to determine database information (e.g., a tag regarding database conflicts). It may be appreciated that a variety of database conflict detection mechanisms may be utilized to determine database information. The database information may be utilized by the lease claim component 206 when attempting to claim a lease (e.g., utilizing the data information when optimistically updating a database).

The execution component 208 may be configured to initiate processing of the singleton task until the new lease expiration expires, based upon a successful attempt to claim the lease. For example, if the singleton task (2) & lease (2) 214 is successfully claimed, then the execution component 208 may initiate processing of the singleton task 2 by server (1) 202. The lease extension component 210 may be configured to extend or relinquish the claim to the lease based the new lease expiration expiring. For example, the extension component 210 may extend or relinquish 226 the lease for the singleton task (2) & lease (2) 214. To extend the lease, the extension component 210 may update the expired new lease expiration with a second new lease expiration, thus allowing the server (1) 202 to continue processing the singleton task (2). Extending the lease may be advantageous when the server (1) 202 has a lot of state and/or overhead associated with the singleton task (2), which would otherwise be replicated if a new server began processing the singleton task (2). If the claim is relinquished, then the validity determination component 204 may be configured to again determine whether the lease for the singleton task is valid or expired.

Figure 3:
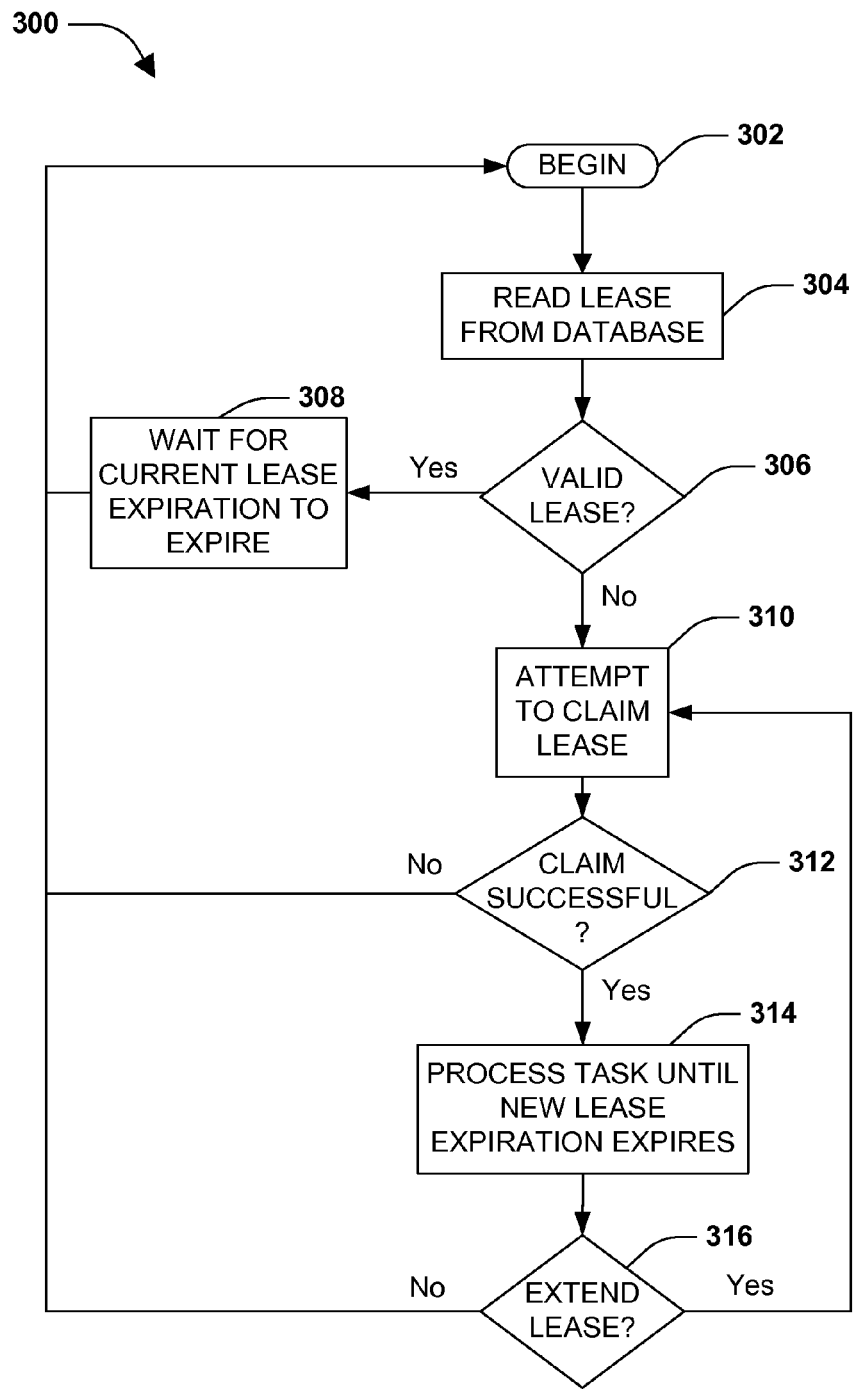
FIG. 3 is a flow chart illustrating an exemplary method of processing a singleton task.

FIG. 3 illustrates a flow diagram 300 of a method for processing a singleton task. At 302, the method begins. At 304, a lease may be read from a database. For example, a row comprising lease data (e.g., a current lease expiration of a lease) of a singleton task may be read. At 306, a determination may be made as to whether the lease is valid or expired. If the lease is valid, then at 308, a server instance may wait and/or perform other processing than the singleton task until a current lease expiration expires (e.g., a current time exceeds the current lease expiration), and then the method again begins at 302.

If the lease is determined to have expired, at 306, then at 310, an attempt to claim the lease is performed. For example, an update to a database row comprising the lease data may be performed using a new lease expiration to update the current lease expiration. At 312, a determination may be made as to whether the claim was successful (e.g., was the database row successfully updated or not). If the claim was unsuccessful, then the method again begins at 302.

If the claim was successful, at 312, then at 314, the singleton task may be processed until the new lease expiration expires. At 316, the lease may be extended, whereupon an attempt to claim the lease may be performed (e.g., the attempt to claim the lease 310), otherwise the lease may be relinquished, whereupon the method again beings at 302.

It may be appreciated that multiple instances of the flow diagram 300 may be executed in a continuous loop for respective singleton tasks within a lease storage component. The multiple instances of the flow diagram 300 may be implemented as a protocol within one or more server instances to provide that singleton tasks are executed per contracts specifying a desirable number of server instances that may process the singleton tasks.

Figure 4:
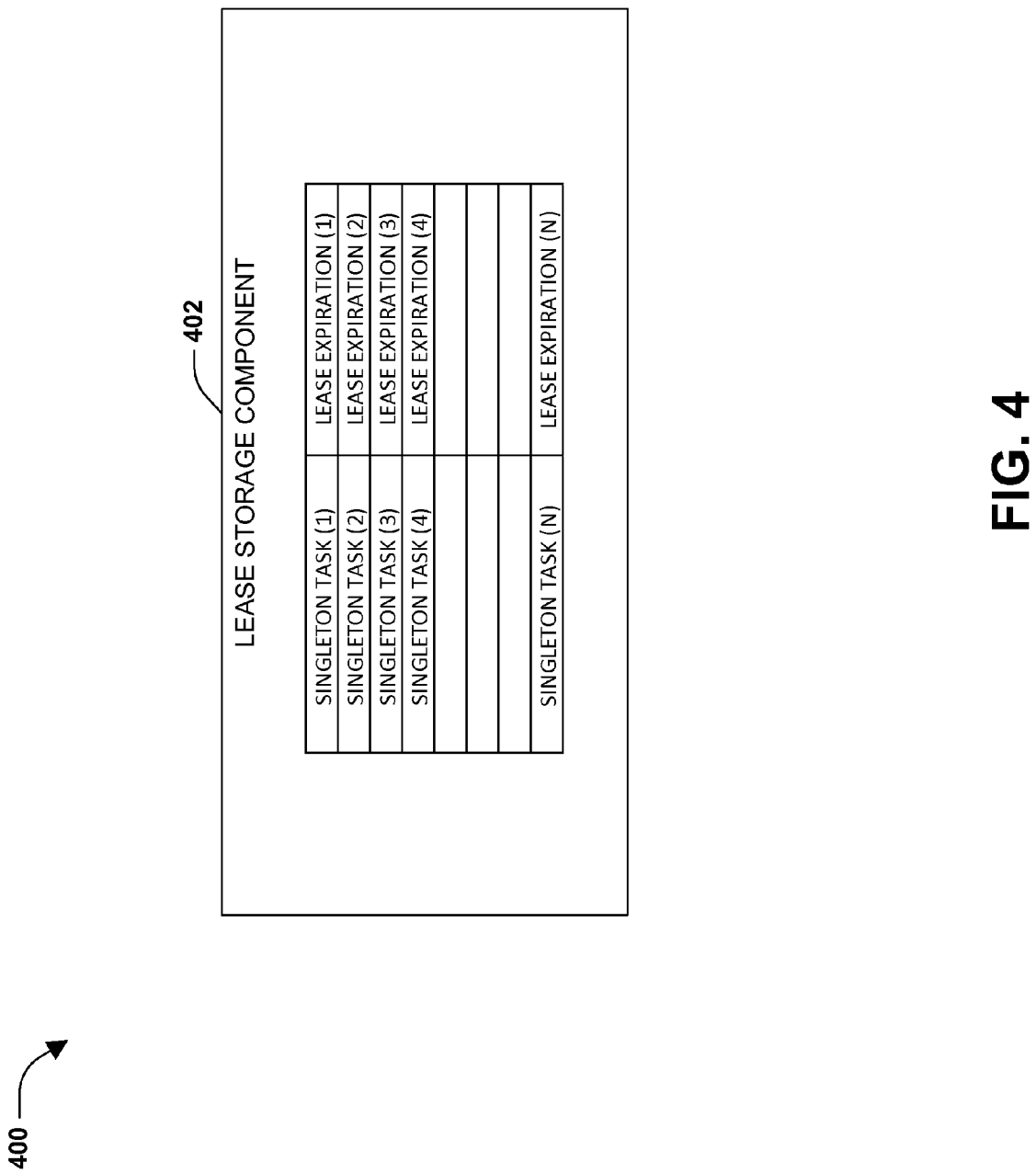
FIG. 4 is an illustration of an example of a lease storage component.

FIG. 4 illustrates an example 400 of a lease storage component 402. In one example, the lease storage component 402 may comprise a database table having multiple rows, respective rows associated with a singleton task (e.g., row 1 comprising lease data for singleton task (1), row 2 comprises lease data for singleton task (2), etc.). A row within the database table may comprise lease data, such as a lease expiration. For example, row 1 comprises lease expiration (1), row 2 comprises lease expiration (2), etc. It may be appreciated that the lease storage component 402 may be implemented in through a variety of techniques (e.g., a data structure comprising lease data for singleton tasks).

Figure 5:
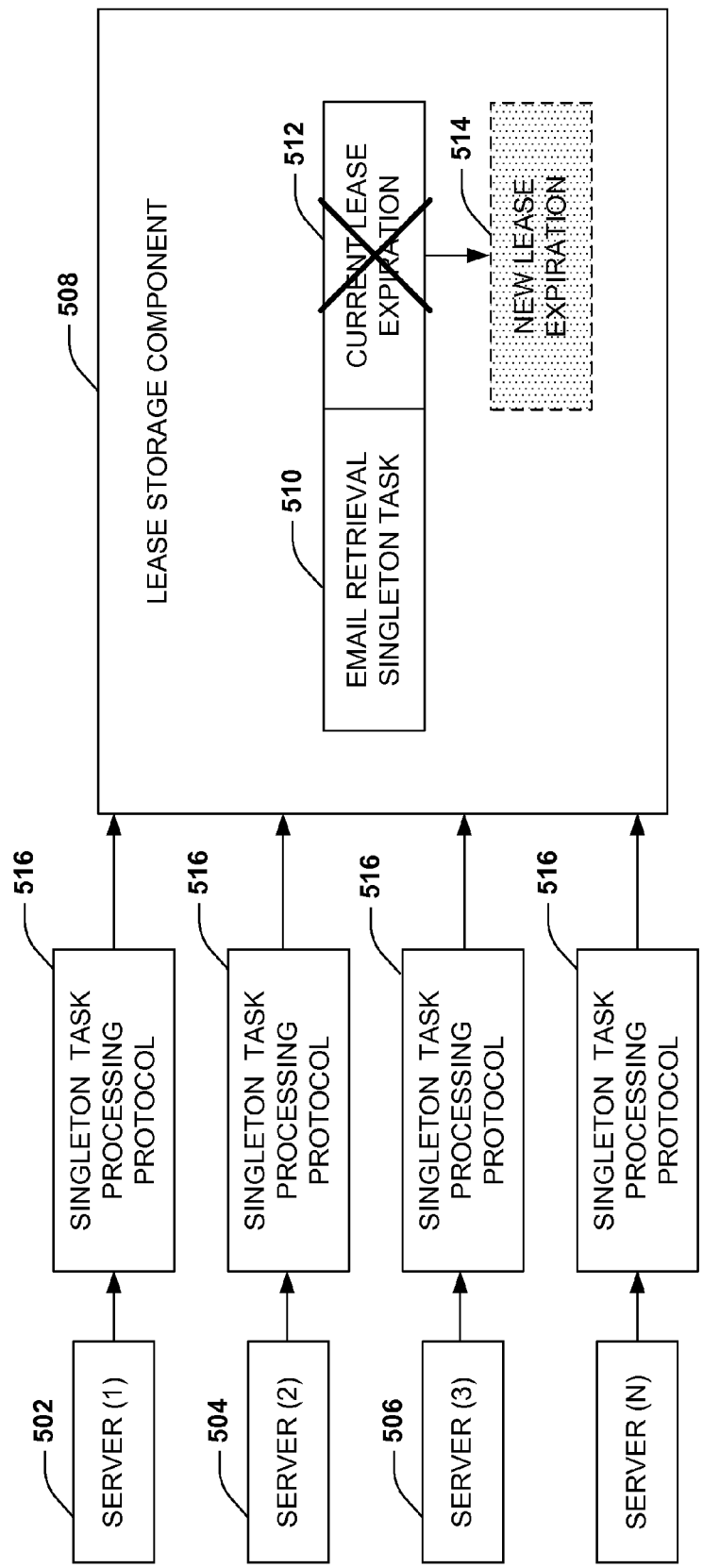
FIG. 5 is an illustration of an example of a server successfully claiming an expired lease.

FIG. 5 illustrates an example 500 of a server successfully claiming an expired lease. A server (1) 502, a server (2) 504, a server (3) 506, and/or other servers may be configured to perform various tasks within a computing environment. It may be appreciated that an arbitrarily large set of servers may be configured to process singleton tasks based upon one or more instances of a singleton task processing protocol 516 (e.g., a system 216 in FIG. 2). It may also be appreciated that multiple instances of the singleton task processing protocol 516 may be utilized (e.g., executed within a loop as a steady state algorithm) within a server for multiple singleton tasks.

In one example, a lease storage component 508 may be configured with an email retrieval singleton task 510 having a lease comprising a current lease expiration 512. The lease storage component 508 and the singleton task processing protocol 516 may be implemented as a leasing model through a database. Server (1) 502 through server (N) may execute instances of the singleton task processing protocol 516 to determine validity of the lease for the email retrieval singleton task 510; claim the lease by attempting to update the current lease expiration 512 with a new lease expiration; and/or process the email retrieval singleton task 510 based upon successfully claiming the lease when the current lease expiration 512 is expired.

For example, server (1) 502 may determine through the singleton task processing protocol 516 that the current lease expiration 512 has expired for the email retrieval singleton task 510. The server (1) 502 may successfully claim the current lease by updating the current lease expiration 512 with a new lease expiration 514. It may be appreciated that server (1) has ownership of the lease once claimed, whereas server (2) 504 and/or other servers do not own the lease and may not process the email retrieval singleton task 510, for example, because a contract may specify that no more than one server may process the email retrieval singleton task 510. Once claimed, the server (1) 502 may process the email retrieval singleton task 510 until expiration of the new lease expiration 514, whereupon the server (1) 502 may extend or relinquish the claim to the lease.

Figure 6:
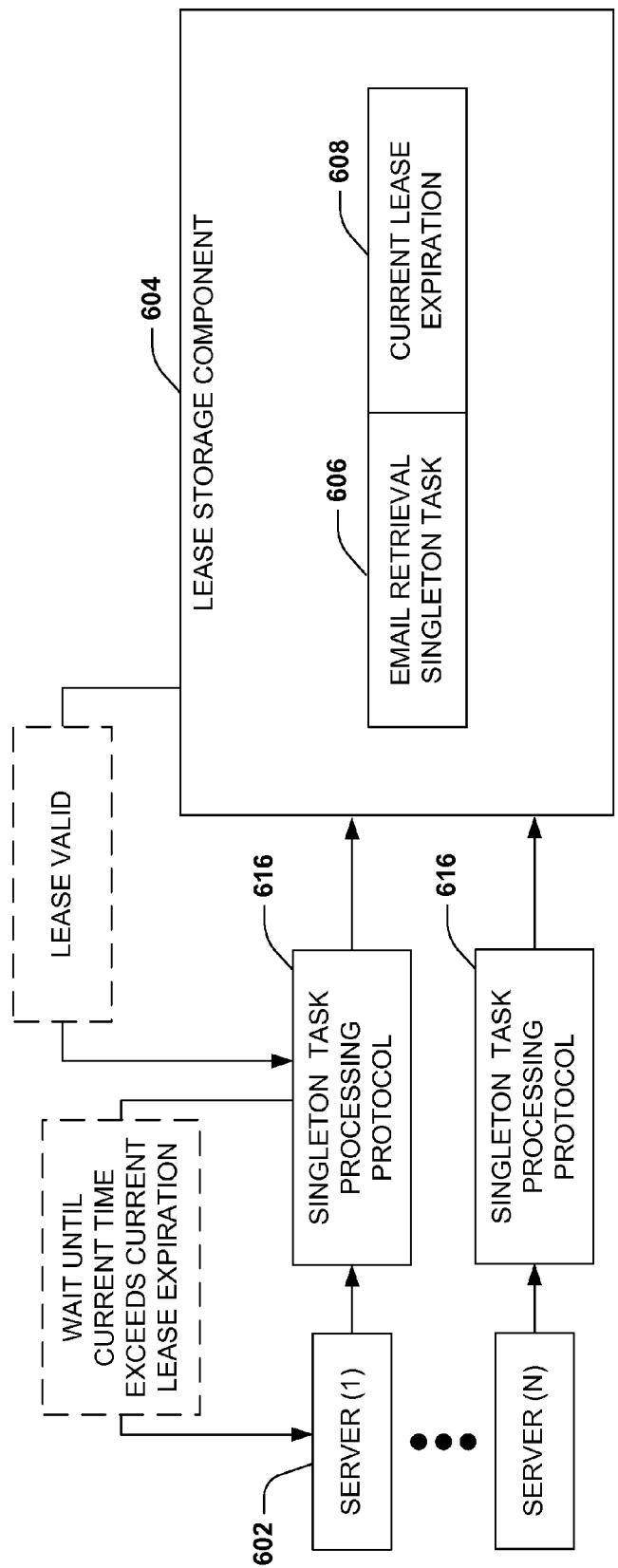
FIG. 6 is an illustration of an example of a server determining a lease is valid.

FIG. 6 illustrates an example 600 of a server determining a lease is valid. A server (1) 602 and/or other servers may be configured to perform various tasks within a computing environment. Respective servers may be configured to process singleton tasks based upon instances of a singleton task processing protocol 616 (e.g., a system 216 in FIG. 2). In one example, a lease storage component 604 may be configured with an email retrieval singleton task 606 having a lease comprising a current lease expiration 608. The lease storage component 604 and the singleton task processing protocol 616 may be implemented as a leasing model through a database. Server (1) 602 through server (N) may execute instances of the singleton task processing protocol 616.

In one example, the lease for the email retrieval singleton task 606 may be determined as valid because the current lease expiration 608 exceeds a current time, thus another server may be processing the email retrieval singleton task 606. The singleton task processing protocol 616 may wait or have its associated server (e.g., server (1) 602) process other tasks until a current time exceeds the current lease expiration. This wait period allows the current lease expiration 608 to potentially expire. When the current time is exceeded by the current lease expiration (e.g., the wait period has lapsed), then the singleton task processing protocol 616 of respective servers (e.g., server (1) 602), may again determine whether the lease for the email retrieval singleton task 606 is valid or expired.

Figure 7:
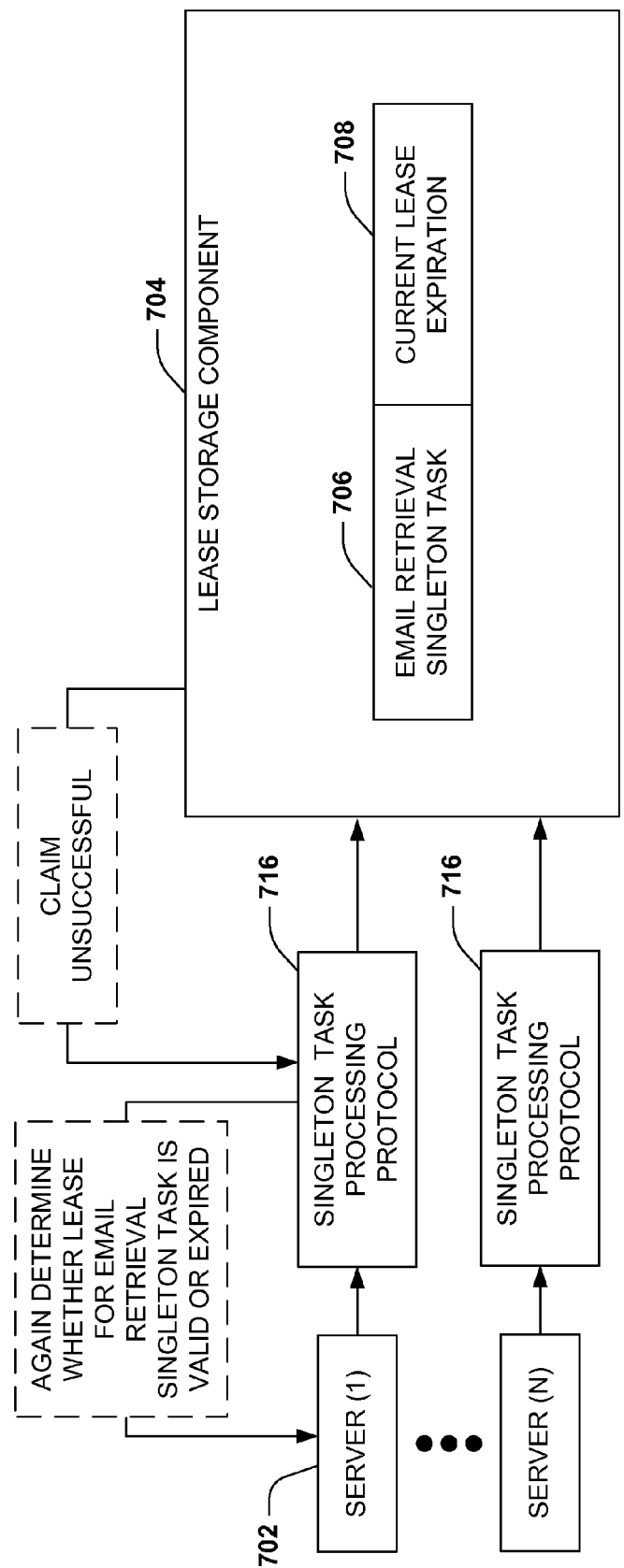
FIG. 7 is an illustration of an example of a server unsuccessfully claiming a lease that is expired.

FIG. 7 illustrates an example 700 of a server unsuccessfully claiming a lease that is expired. A server (1) 702 and/or other servers may be configured to perform various tasks within a computing environment. Respective servers may be configured to process singleton tasks based upon instances of a singleton task processing protocol 716 (e.g., a system 216 in FIG. 2). In one example, a lease storage component 704 may be configured with an email retrieval singleton task 706 having a lease comprising a current lease expiration 708. The lease storage component 704 and the singleton task processing protocol 716 may be implemented as a leasing model through a database. Server (1) 702 through server (N) may execute instances of the singleton task processing protocol 716.

In one example, the lease for the email retrieval singleton task 706 may be determined as expired because a current time exceeds the current lease expiration 708. The singleton task processing protocol 716 may attempt to claim the lease for the email retrieval singleton task 706 by updating the current lease expiration 708 within the lease storage component with a new lease expiration. Because another server may successfully claim the lease, the singleton task processing protocol 716 of server (1) 702, for example, may unsuccessfully claim the lease. Upon unsuccessfully claiming the lease, the singleton task processing protocol 716 again determines whether the lease for the email retrieval singleton task 706 is valid or expired (e.g., performing a loop within the singleton task processing protocol 716 algorithm).

The leasing model implemented through the singleton task processing protocol 716 allows a contract defining a particular sub-set of server instances (e.g., a single server instance) that can concurrently process singleton task to be upheld. This allows singleton task ownership to be reliably assigned across arbitrary autonomous server instances that may have minimal knowledge of one another and/or situations where new server instances are introduced into an always on computer environment without the benefit of bootstrap code.

Figure 8:
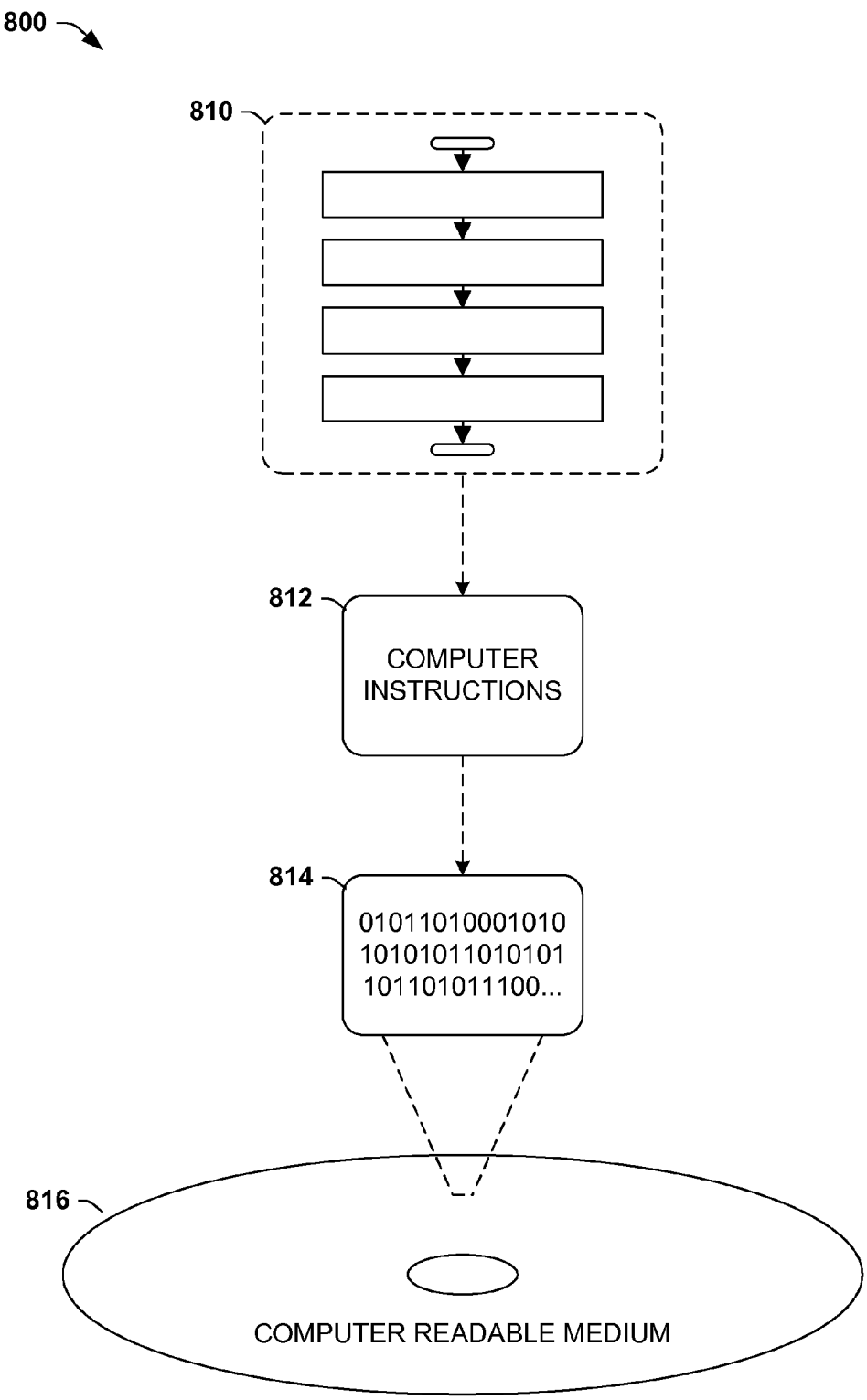
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable instructions 812 may be configured to perform a method 810, such as the exemplary method 100 of FIG. 1, for example. In another such embodiment, the processor-executable instructions 812 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
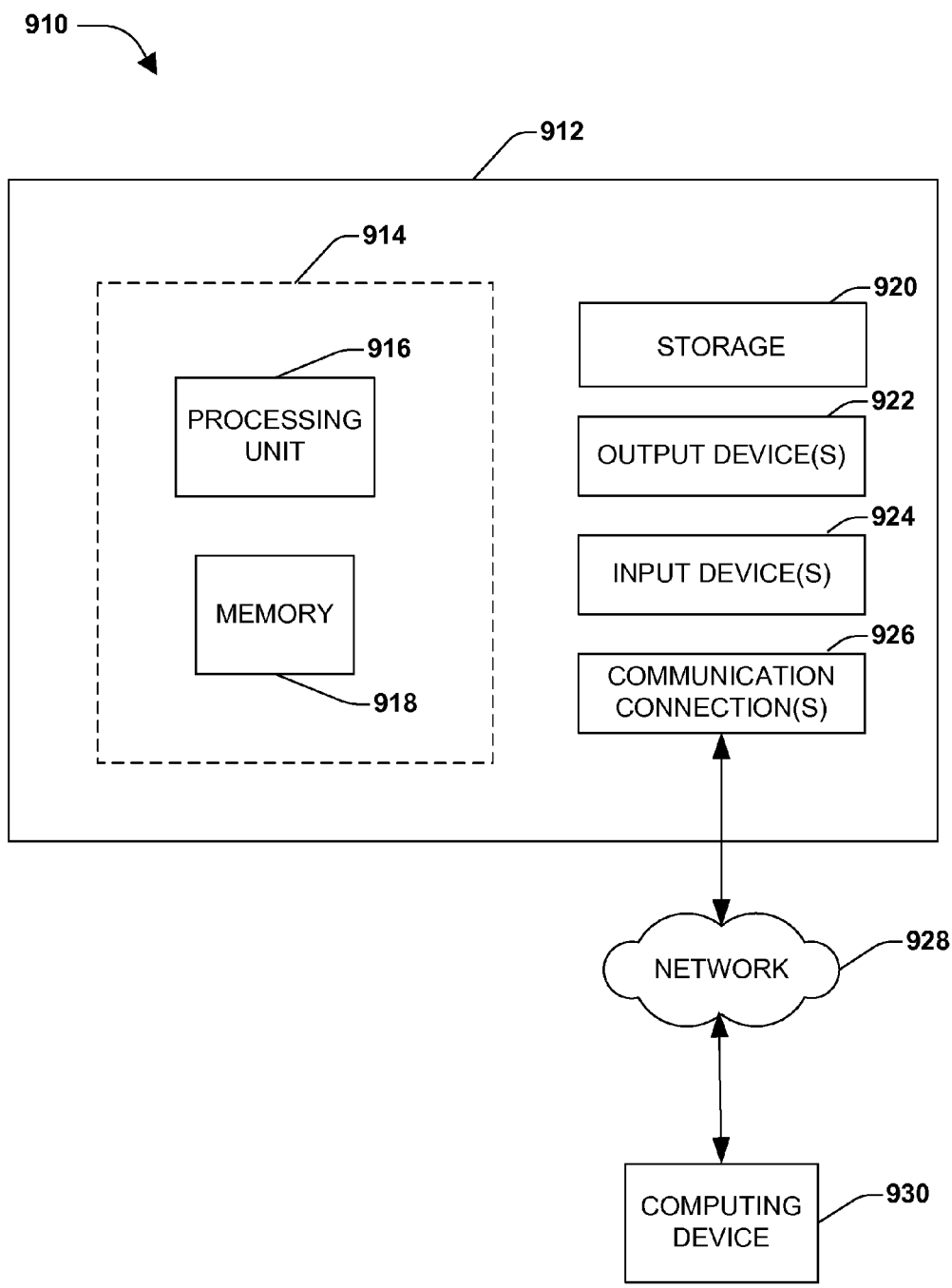
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of processing a singleton task, the singleton task comprising-one or more tasks associated with an internet service, the internet service being implemented using a server instance and the singleton task processed based upon a protocol used by the server instance, the protocol determining whether a lease for the singleton task is valid or expired, the method comprising:
  reading lease data for the singleton task from a database table, the lease data specifying a current lease expiration for the singleton task, the database table comprising a first row and a second row, the first row associated with the singleton task and the lease data, the second row associated with a second singleton task and second lease data;
  responsive to determining the lease for the singleton task is valid based upon the reading, waiting for a current time to exceed the current lease expiration for the singleton task, the lease valid when the current time does not exceed the current lease expiration for the singleton task;
  attempting to claim the lease, after the current time exceeds the current lease expiration, by attempting to update, in the database table, the current lease expiration with a new lease expiration;
  responsive to the attempting to claim being unsuccessful, determining whether the lease is valid, the attempting to claim being unsuccessful when the current lease expiration does not update with the new lease expiration;
  responsive to the attempting to claim being successful, processing the singleton task until the new lease expiration expires; and
  responsive to expiration of the new lease expiration, at least one of extending the lease or relinquishing the lease.

2. The method of claim 1, the second singleton task different than the singleton task.

3. The method of claim 1, the second row different than the first row.

4. The method of claim 1, the second lease data specifying a second current lease expiration for the second singleton task.

5. The method of claim 1, the new lease expiration computed based upon an expected execution time to process the singleton task.

6. The method of claim 1, the attempting to claim the lease comprising:
  attempting to claim the lease based upon an optimistic concurrent database design.

7. The method of claim 1, comprising, prior to the reading lease data:
  obtaining the lease for the singleton task.

8. The method of claim 1, the extending the lease comprising:
  updating the new lease expiration with a second new lease expiration.

9. The method of claim 1, the new lease expiration based upon a pre-defined lease duration.

10. A system, comprising:
  one or more processing units; and
  memory comprising instructions that when executed by at least one of the one or more processing units perform a method of processing a singleton task, the singleton task comprising one or more tasks associated with an internet service, the internet service being implemented using a server instance and the singleton task processed based upon a protocol used by the server instance, the protocol determining whether a lease for the singleton task is valid or expired, the method comprising:
    reading lease data for the singleton task from a database table, the lease data specifying a current lease expiration for the singleton task, the database table comprising a first row and a second row, the first row associated with the singleton task and the lease data, the second row associated with a second singleton task and second lease data;
    responsive to determining the lease for the singleton task is valid based upon the reading, waiting for a current time to exceed the current lease expiration for the singleton task, the lease valid when the current time does not exceed the current lease expiration for the singleton task;
    attempting to claim the lease, after the current time exceeds the current lease expiration, by attempting to update, in the database table, the current lease expiration with a new lease expiration;
    responsive to the attempting to claim being unsuccessful, determining whether the lease is valid, the attempting to claim being unsuccessful when the current lease expiration does not update with the new lease expiration;
    responsive to the attempting to claim being successful, processing the singleton task until the new lease expiration expires; and
    responsive to expiration of the new lease expiration, at least one of extending the lease or relinquishing the lease.

11. The system of claim 10, the second singleton task different than the singleton task.

12. The system of claim 10, the second row different than the first row.

13. The system of claim 10, the second lease data specifying a second current lease expiration for the second singleton task.

14. The system of claim 10, the new lease expiration computed based upon an expected execution time to process the singleton task.

15. The system of claim 10, the attempting to claim the lease comprising:
  attempting to claim the lease based upon an optimistic concurrent database design.

16. The system of claim 10, the extending the lease comprising:
  updating the new lease expiration with a second new lease expiration.

17. The system of claim 10, the new lease expiration based upon a pre-defined lease duration.

18. A computer-readable storage media, excluding signals, comprising computer-executable instructions that when executed perform acts for processing a singleton task, the singleton task comprising-one or more tasks associated with an internet service, the internet service being implemented using a server instance and the singleton task processed based upon a protocol used by the server instance, the protocol determining whether a lease for the singleton task is valid or expired, the acts comprising:
  reading lease data for the singleton task from a database table, the lease data specifying a current lease expiration for the singleton task, the database table comprising a first row and a second row, the first row associated with the singleton task and the lease data, the second row associated with a second singleton task and second lease data;

responsive to determining the lease for the singleton task is valid based upon the reading, waiting for a current time to exceed the current lease expiration for the singleton task, the lease valid when the current time does not exceed the current lease expiration for the singleton task;

attempting to claim the lease, after the current time exceeds the current lease expiration, by attempting to update, in the database table, the current lease expiration with a new lease expiration;

responsive to the attempting to claim being unsuccessful, determining whether the lease is valid, the attempting to claim being unsuccessful when the current lease expiration does not update with the new lease expiration;

responsive to the attempting to claim being successful, processing the singleton task until the new lease expiration expires; and responsive to expiration of the new lease expiration, at least one of extending the lease or relinquishing the lease.

19. The computer-readable storage media of claim 18, the second singleton task different than the singleton task.

20. The computer-readable storage media of claim 18, the second row different than the first row.

* * * * *